May 19, 1959

G. K. C. HARDESTY 2,886,911

DUO-PANEL EDGE ILLUMINATION SYSTEM

Filed July 23, 1953

INVENTOR.
GEORGE K. C. HARDESTY

BY George Sipkin
B. L. Zanquill
ATTORNEYS

2,886,911

DUO-PANEL EDGE ILLUMINATION SYSTEM

George K. C. Hardesty, Mayo, Md.

Application July 23, 1953, Serial No. 369,976

11 Claims. (Cl. 40—130)

(Granted under Title 35, U.S. Code (1952), sec. 266)

The invention described herein may be manufactured and used by or for the Government of the United States of America for governmental purposes without the payment of any royalties thereon or therefor.

The present invention relates to the illumination of instrument dials and panels and more particularly to an improvement in the illumination of instrument dials and panels designed to enable observers to retain a high degree of dark adaptation.

In general, the illumination of instrument dials and panels for night visibility such as clocks, meters, automobile instruments and similar devices with conventional lighting means has been quite adequate. However, in such instances the efficiency of the illumination and the glare produced thereby are relatively unimportant considerations. With the increasing use of instruments aboard aircraft, ships, and other installations using multitudes of visual indicators, the continued use of conventional dial and panel illumination involving direct lighting resolves itself into a complex system presenting serious problems of construction and maintenance. Furthermore, with a cluster of such instruments, the illumination system has an adverse effect on the dark adaptation of personnel and produces considerable specularly reflected light or glare which considerably lowers the visual perception of the operator and is otherwise objectional in its psychological effects.

In order to overcome these difficulties, resort has been made to various arrangements including edge illumination or "light-piping" of the dials and panels. This form of illumination as now applied to illuminate control panels of aircraft and the like provides for the entrance of light energy in the form of rays at the edge portion of a transparent panel member having a pair of upper and lower parallel polished surfaces with translucent indicia outlined on one surface thereof by an opaque black field and an opaque or translucent reflecting coating on one or both surfaces. Due to repeated internal reflection of the light rays between the two parallel polished surfaces, the light rays pursue a somewhat indeterminate path through the panel coincident with their impingement with the opaque coating, the light rays are diffusely reflected and suffer partial loss by absorption in the reflecting coating. The light rays transmitted through the indicia serve to illuminate them, but the light rays diffusely reflected or refracted at a point remote therefrom and having an angle of direction greater than the complement of the critical angle of the transmitting medium leave the panel and are lost by absorption to the surrounding opaque coating. With such large areas of coating, great losses in light energy occur. In another common form of edge illuminated panels, the panels comprise polished transparent glass or plastic sheets on which indicia are painted, etched, or engraved, and the appearance of an opaque field is provided by an opaque backing element on the rear surface thereof or assembled behind it. In such a form, experience has shown that difficulties with parallax and refracted images of the light energy source are present when the overall space and size of the member is restricted, as when a small dial is to be illuminated, and that all physical imperfections in the polished surfaces and the panel itself act to diffusely reflect the light energy to create an objectional haze over the instrument dial.

In many instances it is essential that the instrument dials and panels be quickly and accurately observed during night operations. It is recognized that "dark adaption," i.e., the maximum ability to see in the dark, is desirable in such instances and that red light or the energy in the red end of the visible spectrum does not materially destroy the dark adaptation of personnel. Since red light is obtainable in a practical sense by the use of optical filters designed to absorb all undesirable portions of the spectral energy emitted by the usual miniature tungsten filament lamps, and that such filters absorb approximately 90% of the total visible light energy, a highly efficient illuminating system is necessary for proper illumination of the panel with the remaining 10% of the light energy.

Therefore, one of the prime objects of the present invention is to provide an improved panel edge illumination system which is particularly suitable in locations wherein the preservation of a high degree of dark adaptation of personnel is imperative and wherein a novel cooperative combination and arrangement of a light transmitting panel and a light diffusing panel, optically separated from each other, provides an extremely low-loss edge illumination system.

Another object of the invention is the provision of an illumination system for dials and panels which presents an increased contrast between the markings and the background over the entire visible display of a dial or panel.

Still another object of the invention is the provision of a low-loss panel or dial illumination system wherein the indicating elements of the instrument including the pointers or other positionable elements of the instrument may be efficiently illuminated by internally supplied light energy for night observation with a minimum disturbance of the observers dark-adaptation and by reflection of external light impinging on the instrument for daylight observation.

An object of the present invention is the provision of an illumination system for dials and panels wherein all visible markings of the dials and panels are uniformly illuminated.

A further object of the invention is the provision of an edge illumination system which provides a minimum of specularly reflected light or glare upon the surface of the indicating elements or upon their transparent enclosures.

A still further object of the present invention is the provision of an edge illumination system which is easily manufactured and which is virtually free of parallax, haze, and reflected images.

Another object of the invention is the provision of a simple, compact edge illumination system which is highly efficient and yet compatible with present day instrument panels and dials.

With these and other objects in view as will hereinafter more fully appear, and which will be more particularly pointed out in the appended claims, reference is now made to the following description taken in connection with the accompanying drawings in which:

Figure 1:
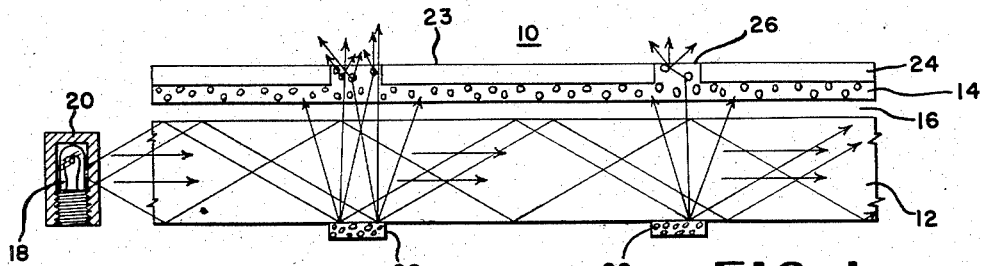
Fig. 1 is a cross-sectional view illustrating the principle of one embodiment of the duo-panel system of the instant invention and wherein the paths of emitted light energy from a light source are broadly outlined.

Referring now to the drawings, wherein like reference characters designate like or corresponding parts throughout the several views, there is shown in Fig. 1 a cross-sectional view of a preferred embodiment of a duo-panel illumination system 10 comprising the invention including a light transmitting panel 12, a light diffusing panel 14 optically separated therefrom by suitable means such as an air space 16, and a light energy source 18 adapted to introduce light energy in the form of light rays into the light transmitting panel along an edge surface thereof for transmission therethrough by reflection against the adjacent upper and lower surfaces of the panel 12. Provision in the form of diffusing areas 22 is made for permitting the light energy internally transmitted in the panel 12 to be selectively transmitted through the upper surface of the panel 12 for illumination purposes.

Diffusing areas 22 which are of predetermined size and shape, are provided upon the lower surface of the panel 12 opposite the desired areas to be illuminated, and operate to diffusely reflect any light rays impinging thereon. The reflected light rays which exceed the complement of the critical angle of the material comprising the light transmitting element 12 are transmitted through its upper surface, through the air space 16 and enter light diffusing panel 14 whereupon the light rays are again diffused but to a greater extent and serve to illuminate the panel. The term duo-panel illumination system as herein used is intended to denote the illumination of a dial, object or the like by the selective transmission of light energy from a first panel to a second panel optically separated therefrom. By avoidance of physical contact between the first and second panels and by the selective diffuse reflection of the internally transmitted light energy, much greater efficiency in illumination is obtained.

The light transmitting panel or member 12 comprises a large flat transparent plate, having its upper and lower surfaces in parallel relation to each other and preferably polished to provide a smooth optical surface. Member 12 is of such suitable physical dimensions as to effectively transmit light energy to all portions of a juxtapositioned light diffusing panel. Although any clear, colorless, transparent light transmitting material may be used in forming the light transmitting member 12, the member is preferably fabricated from an acrylic resin or methyl methacratate plastic material of the thermoplastic type such as, for example, "Lucite" or "Plexiglas." Thermosetting materials such as the allyl resins also are applicable.

The under surface of the light transmitting member 12 is provided with diffusing surfaces 22 formed in the member by etching with an engraving tool or the like or by applying a coating of translucent or opaque paint directly to the surface. The coating of paint may be applied by the silk screen or the paint spray process, the only requirement being that the paint be in optical contact with the light transmitting element. Since the diffusing surfaces are placed over a limited area and in selected, desired locations, a high degree of local control may be exercised over the utilization of the light rays travelling within the panel and therefore, the quantity of light made available to other elements of the system. For best efficiency, the diffusing surfaces 22 are positioned opposite the indicia of the instrument panel as hereinafter set forth.

Suitably supported in a juxtapositioned relation with the light transmitting element 12 and separated therefrom by an air space 16 or other suitable optical separating means is the indicia bearing light diffusing panel or element 14 comprising a translucent plate formed of suitable plastic materials or the like such as the class of acrylic resins or materials and their polymers and copolymers, although suitable white acetate sheets may be employed. The optical characteristics of the material comprising the panel 14 are such that a considerable quantity of the light energy entering the panel from the light transmitting panel 12 is diffusely transmitted therethrough.

The upper or obverse surface 23 of the light diffusing panel is arranged to be viewed by an observer and is provided with indicia 26 such as graduations and numerals distributed in the usual manner in or around the periphery of the dial. A lamination 24 of opaque or impervious material to light energy is provided upon the obverse surface 23 of light diffusing panel 14 which lamination may comprise a layer of black lacquer or paint, spray coated upon the surface. The indicia are provided by exposing patterned areas of the translucent material 14 defining the specific indicia of the dial, through the opaque lamination 24 and preferably, the translucent material defining the indicia is raised to a level at least equal to the level of the opaque coating. It will be observed that the lamination 24 and the translucent material are of contrasting colors and present an accentuated, sharply defined indicium to an observer. While any rear illuminable translucent panel having good daylight contrast between the indicia and its background may be used, the combination of a translucent plastic panel 14 and a black lacquer lamination 24 produces an optimum ratio between daylight reflectivity and internal transmission of light introduced from the rear of the panel.

A suitable light energy source such as a miniature tungsten filament bulb 18, suitably energized from an electrical power source, is placed adjacent the edge portion of the light transmitting panel 12 such that the light rays emitted thereby enter the panel 12 substantially parallel to the upper and lower surfaces of the panel. A cup-shaped cylindrical filter 20 completely encloses the bulb 18 and functions to absorb substantially all portions of the spectral energy emitted by the bulb 18 with the exception of the desired red light. The filter 20, which is preferably of red acrylic material ranging in thickness from $1/16$ to $1/8$ of an inch is preferably provided with suitable support means for the bulb 18 and is supported within the panel by openings provided therein.

It is obvious, of course, that the invention may be practiced with the use of any visible light energy and although it is particularly suited for use where the total light energy is limited as for example where red light of the spectrum is desired to increase the dark adaptation of viewing personnel, the invention is not necessarily limited thereto.

As the light rays emitted from source 18 enter the light transmitting element 12 they are specularly reflected, internally, from one surface to the other throughout the entire panel and since it is well known that light travelling by internal reflection between polished surfaces of a transparent panel does not diminish in intensity according to the inverse square law, substantially all the light energy entering the panel will progress to the opposite boundary or periphery of the element.

The utilization of this light energy is controlled by selectively controlling the placement and the area of the diffusing surfaces 22. These areas produce diffuse reflection of the light rays impinging thereon in the desired locations such that the light rays are reflected adjacent to and in the direction of the indicia. The reflected light rays exceeding the complement of the critical angle of the material comprising the light transmitting element are transmitted through the surface thereof, the air space adjacent thereto and enter the light diffusing translucent element 14 wherein the light energy is further transmitted by the element in a diffusing manner. The reflected light rays which penetrate the translucent panel 14 through the translucent areas defining the indicia provide the light energy to clearly illuminate the instrument dial or panel. With the selective utilization of the light energy and the control thereof throughout the panel means, a substantially uniform illumination of all visible indicia on the dial is obtained.

It is evident therefore that since there is no undesired optical contact with the light transmitting element to produce uncontrolled diffuse reflection, substantially all of the light energy is conserved in the light transmitting panel and this light is available for economical utilization thereof through the selective placement of the light diffusing surfaces. Therefore, little loss of light energy is suffered by absorption of the energy in an opaque coating or otherwise. This results in an extremely low-loss illumination system. Also, through the use of an opaque background for the indicia, and the placement of the indicia in a plane near the plane of such pointers which cooperate with the panel, parallax, reflected images, and haze are eliminated.

Figure 2:
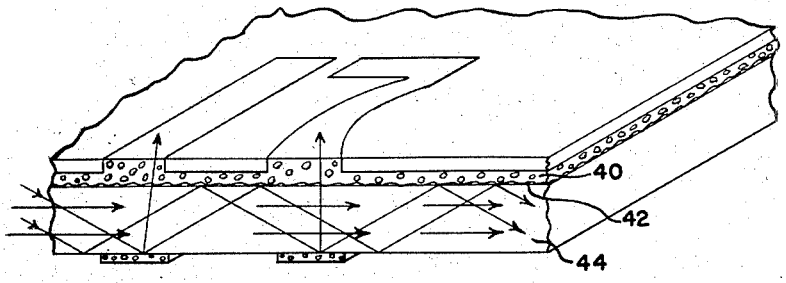
Figs. 2 and 3 are cross-sectional views similar to Fig. 1 but illustrating modifications thereof and wherein physical contact between the light transmitting and the light diffusing panels is obtained without optical contact.

In instances where suitable side support of the translucent element 14 is difficult to obtain without optically contacting the transparent elements, reference is made to the modification of Fig. 2 wherein the light diffusing element 14 is physically supported by the light transmitting element 12 without an optical contact therewith. The term optical contact as herein used is intended to indicate any contact or juncture between the surface of a transparent optical body and another element that will substantially impair internal reflection within the transparent body, particularly the quality of total reflection. Conversely, the term optical separation is intended to indicate any separation, contact or juncture between the surface of a transparent optical body and another element wherein the internal reflection within the transparent body is substantially unimpaired, particularly the quality of total reflection. Thus by the use of a physical contact between the light transmitting panel 12 and the light diffusing panel 14, without an optical contact, physical support of the light diffusing element 14 may be obtained without interfering with the internal reflection quality of the light transmitting element 12. Since optical contact between two elements generally requires an adhesion, opically flat parallel surfaces between them, or a large force applied between the elements, physical contact may be made without a resulting optical contact.

As shown in Fig. 2, physical contact without optical contact may be provided in one modification by forming the under surface of the light diffusing panel 40 with undulations or corrugations 42 comprising a patterned surface. The patterned surface 42 of the panel 40, which is adapted to physically contact the member 44, establishes a substantial line or point contact between the light transmitting and the light diffusing panels. The total force applied between the elements is that force exerted due to the weight of the light diffusing panel which is comparatively light. Since this force is substantially negligible with respect to the force necessary for an optical contact between the elements and since the area of contact between the elements is negligible due to the point or line contact between them, the light diffusing panel 40 is supported on light transmitting element 44 by a physical contact without an optical contact. It is clear, however, that other suitable and conventional means may be provided to obtain physical contact without an optical contact between the elements.

Figures 3, 4:
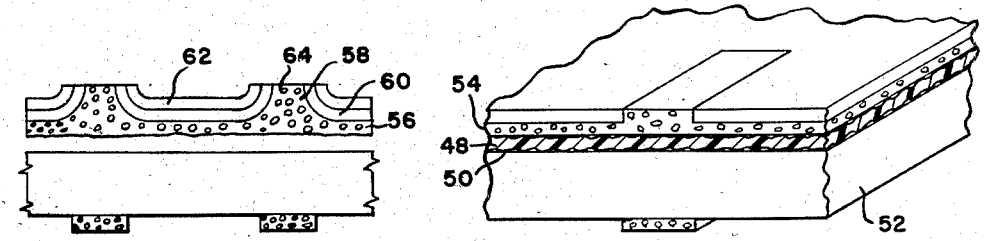
Figs. 4, 5 and 6 are cross-sectional views of other embodiments of the instant invention showing modifications in the light diffusing panel relative to the formation of indicia thereon for efficient illumination.

Fig. 3 discloses another modification for obtaining a physical contact without optical contact between the light transmitting and light diffusing elements of the duo-panel system. A flat patterned separating element or plate 48 having undulations or corrugations 50 formed on either or both surfaces thereof is positioned between a light transmitting element 52 and a light diffusing element 54. Plate 48, which may be formed of any suitable material including the compounds comprising the light transmitting and light diffusing panels is preferably formed without light diffusing properties in order not to significantly alter the distribution of light rays emitted from the light transmitting panel 52 in the direction of the indicia provided on the light diffusing panel 54. As in the modification of Fig. 2, the undulations 50 function to physically support the light diffusing panel 54 upon the light transmitting panel 52 without providing significant optical contact therebetween whereby the quality of total reflection within the panel 52 is substantially unimpaired.

It has been found that the light rays which have been reflected by the painted areas and transmitted to the light diffusing panel 14 (Fig. 1) and diffusely reflected therein have a tendency to migrate through the translucent light diffusing panel itself by repeated reflections occurring in the panel 14. Although the major portions of the light energy are transmitted through the translucent openings 26 defining the indicia, it is desired to obtain the maximum light transmission through the openings 26 for illumination purposes especially when red light is employed and the greatest efficiency is desired.

Fig. 4 discloses an embodiment of the duo-panel illumination system wherein the light diffusing panel is modified to produce an increased energy transmission through the translucent indicia. The light diffusing panel 56 comprising a light diffusing material similar to the embodiment of Fig. 1 is fabricated by an etching process or the like with embossed or raised graduations 58 defining the indicia of the instrument dial. The embossed graduations may be of any suitable height but preferably the graduation is approximately .013 inch in height. A thin lamination 60 of white lacquer, preferably of good reflecting optical qualities, is applied to the obverse surface of the panel 56 by spray coating the indicia bearing panel 56 and then permitting the lacquer to dry. A second thin lamination 62 of opaque black lacquer, impervious to light energy, is applied over the white lacquer lamination 60 and dried whereby a three-ply laminated light diffusing panel is produced. The outermost surface 64 of each graduation is then cleaned of all lacquer by the use of a fine abrasive cloth or the like to expose the indicia to the view of an observer. The white lamination 60 provides a good daylight contrast with respect to the black lamination 62 and thus produces the effect of an accentuated indicium when viewed with an external light. Since the white lamination also has good reflecting characteristics the efficiency of the dial is materially increased for the reason that any light energy migrating in the light diffusing panel and impinging on the sloping surfaces of the white lamination 60 will be reflected through the translucent indicia defining graduation into the field of view of an observer.

Figure 5:
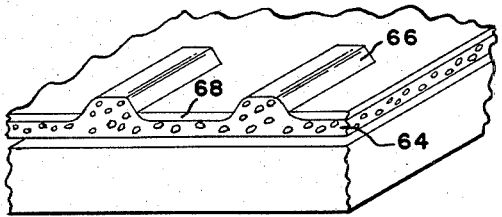

Fig. 5 discloses a further modification of the light diffusing panel whereby the total visibility of the dial is increased due to the better utilization of external light. The light diffusing panel 64 of suitable light energy diffusing material similar to the embodiment of Fig. 1 is formed with embossed or raised indicia 66 on the front surface thereof with the indicia extending well above the top surface of the panel. This embossing process may be performed by a stamping method involving the application of heat and pressure to the light diffusing panel 64 or by other conventional means. After embossing, a thin layer of opaque black lacquer 68 is applied to the surface by any suitable conventional process and the lacquer permitted to dry. The embossed indicia are kept free of the opaque lamination in order that substantially all the upper surfaces of the indicia are exposed to the external light energy. Raising the indicia above the level of the opaque dial surface permits a large degree of isolation of the indicia from the opaque area and presents a good daylight contrast with respect to the black lamination. Also, the embossed indicia, which has approximately 180° of its surface area exposed to the external light permits the utilization of light energy approaching the indicia in planes approaching the parallel to the opaque surface 68 to enhance the daylight reflectivity of the indicia whereby the light energy impinging thereon will be reflected into the field of view of an observer. Furthermore, since the embossed indicia are free of optical opaque material on all outer surfaces thereof a larger translucent area is presented to the transmitted light rays reflected internally, in the panel 64 whereby a greater percentage of the light rays are emitted for illumination purposes and only a relatively small quantity of light energy is lost due to migration in the panel 64.

Figure 6:
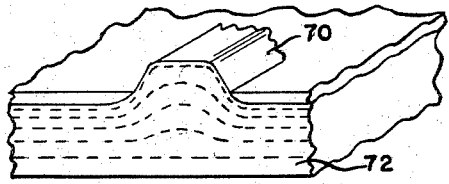

A high ratio between daylight reflectivity of the exposed indicia and the transmission of internal light introduced from the rear of the panel may be produced by the modification as disclosed in Fig. 6. This modification is similar to the embodiment shown in Fig. 5 with the exception that the material comprising the embossed indicia 70 of the light diffusing panel 72 has a graduated density; the embossed area having a much greater density than the translucent material remote therefrom. Through the use of this graduated density, a greater diffuse reflection of the external and internal light energy is obtained in the indicia and hence, a greater transmission of internal light in assured as well as excellent reflectivity of external light or daylight.

Figure 8:
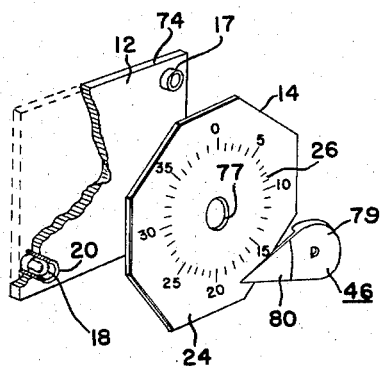
Fig. 8 is a perspective exploded bottom view, partially in section of the instrument dial of Fig. 7 illustrating the specific features therein.
Figure 7:
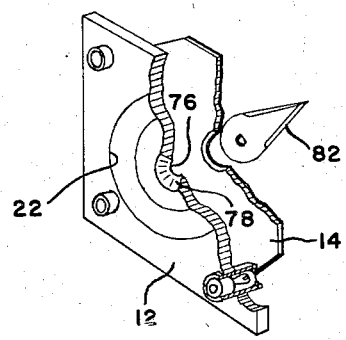
Fig. 7 is a perspective exploded view, partially in section, of an instrument dial incorporating elements of the duo panel illuminating system of the instant invention.

Reference is now made to Figs. 7 and 8 wherein the elements of the duo-panel illumination system are disclosed in a practical embodiment of an instrument dial utilizing a piped-light pointer arrangement. Light transmitting panel 12, which is substantially rectangular in shape for adaption to a particular instrument, is positioned in the rear portion of the instrument dial and is provided at convenient locations thereon, preferably adjacent each corner thereof, with suitable apertures 17 adapted to receive and support the red-filter-caps 20. Light energy sources 18 comprising miniature tungsten filament bulbs are inserted within the filter-caps 20 and suitably energized with electric current. The light energy emitted from the bulb is filtered of all visible energy with the exception of the red end of the spectrum which enters the light transmitting panel 12 in a general direction parallel to its upper and lower surfaces. The light energy received by the panel 12 is then transmitted throughout the panel by internal specular reflection. If desired, the edge portions 74 of the panel 12 are coated with a white reflecting material such as white lacquer to reflect the light energy impinging against the edge surfaces back into the panel.

The rear surface of the light transmitting panel 12 has selectively applied thereto a diffusing surface 22 of white paint positioned substantially adjacent to the indicia formed on the light diffusing panel 14. Diffusing surface 22 which ordinarily is of a like size and number as the indicia, covers an annular area as a practical measure to diffuse and direct the light energy to the multitude of graduations and indicia comprising the dial surface, although a like multitude of painted areas may be employed. An aperture 76 is formed in the center of the light transmitting panel 12 and has an outwardly projected bevel edge 78 directed approximately 45° from the plane of the panel, which edge produces a surface with reflecting qualities formed thereon by etching or other suitable processes whereby any light rays traveling in the panel 12 and impinging upon the surface are reflected through an aperture 77 in panel 14 in the direction of a pointer 46. If desired, light may be introduced into the pointer by employing an area of light diffusing material, such as paint, on the panel 12 and under the pointer hub in lieu of the beveled aperture whereby the diffusing material will act to reflect the light energy to the pointer.

Light diffusing panel 14 is suitably mounted adjacent the panel 12 but optically separated therefrom by an air space and is provided on its front or obverse surface with a multitude of embossed indicia 26, similar to Fig. 5, distributed in a conventional manner near the periphery of the dial. The dial face or obverse surface of the panel 14 is provided with a black opaque surface whereby an increased contrast is provided with the indicia. Pointer structure 46 may be of any suitable construction such as, for example, the pointer structure disclosed in Patent No. 2,410,064 granted to the instant inventor on October 29, 1946. Alternately, the pointer 46 comprises a transparent, clear, colorless acrylic material contoured as indicated in Figs. 7 and 8 to form a hub portion 79 and a pointer element 80. The hub portion 79 is coated with a white optical reflecting coating and then covered with a black opaque coating for efficient reflection of light energy in the direction of the pointer element 80. The under surface of the pointer element 80 has its edges 82 beveled which edges are coated with a white optical reflecting coating for reflection of the light energy within the pointer externally to the view of an observer.

In operation, energizing of the lamps 18 produces light rays which are filtered by the filter caps 20 to provide red light energy. The light rays enter the light transmitting panel 12 and are specularly reflected within the panel 12 until impinging upon the diffusing surface 22 and the light reflecting bevel edge 78 in the center of the panel 12. In each instance of impingement the light will be reflected, respectively, in the direction of the light diffusing panel 14 and the pointer structure 46. Since the light rays enter the light diffusing panel 14 at desired areas only, the light will be diffusely transmitted and emitted through the translucent openings provided by the indicia at 26. Also, the light from the bevel portion of the light transmitting element will impinge against the pointer hub 79 and reflected to illuminate the pointer 80. The function of the diffusing area thus further establishes the brightness of the indicia for uniform illumination between the various indicia and also, obtains the desired ratio of indicia brightness with the brightness of the pointer.

In an experimental illumination system employing a pressure gage having a dial diameter of 10 inches and a plastic pointer of 5 inches radial length, a total of four miniature 6–8 volt tungsten lamps, having red optical filters thereon, properly illuminated the dial when the duo-panel illumination system of the instant invention was used. Even after two of the lamps had failed, the dial was usefully illuminated. However, in an edge illumination system of the prior art, a total of six similar 6–8 volt tungsten lamps were employed to illuminate the dial but even then, sufficient illumination was not provided for visibility of the dial.

It is clear therefore that an efficient low-loss edge illumination system is provided and wherein parallax, haze, and refracted images are eliminated. Further, it is seen that the duo-panel illumination system is completely compatible with the construction of the present day instrument dials and panels and could be readily incorporated therein with the minimum of cost and effort.

Obviously many modifications and variations of the present invention are possible in the light of the above teachings. It is therefore to be understood, that within the scope of the appended claims the invention may be practiced otherwise than as specifically described.

What is claimed and desired to be protected by Letters Patent of the United States is:

1. A duo-panel edge illumination system comprising, a first panel of transparent material having substantially parallel front and rear reflecting surfaces, said surfaces being polished and operative to specularly reflect light rays in said panel, a second panel of translucent material substantially parallel to said surfaces positioned adjacent to said first panel, said first and second panels having an optical separation therebetween, said second panel having indicia means formed on an obverse face thereof, and light diffusing means in optical contact with the rear reflecting surface of said first panel for directing a portion of said light rays from the rear surface of the first panel into and through the second panel to said indicia means for illuminating the indicia means, said light diffusing means including a coating of light diffusing material placed in optical contact with the rear polished surface of the first panel opposite the indicia means formed on the obverse face of the second panel, the front and rear polished reflecting surfaces of the first panel otherwise being substantially free of interference with the transmission of light therebetween.

2. In a duo-panel edge illumination system means for illuminating the indicia of a dial or the like, said means including a light transmitting panel of transparent material having substantially parallel front and rear reflecting surfaces polished and operative to specularly reflect light rays introduced therein, a light diffusing panel having a lower surface adjacent and parallel to said parallel reflecting surfaces, said light transmitting and light diffusing panel having an optical separation therebetween, a light-impervious coating on an upper surface of said light diffusing panel, indicia means formed on the upper surface of said light diffusing panel, the outline of said indicia means being defined by said light-impervious coating, and light diffusing means selectively positioned on and in optical contact with the rear surface of said light transmitting panel opposite said indicia means for selectively directing a portion of said light rays to said indicia means for illumination thereof, said light diffusing means including a coating of paint applied directly to the polished rear surface of the light transmitting panel, the front and rear polished surfaces of the light transmitting panel being otherwise substantially bare.

3. In a duo-panel edge illumination system, means for illuminating a dial or the like comprising, a transparent light transmitting panel having plane, polished and parallel upper and lower reflecting surfaces for specularly reflecting light rays introduced therein from a light source, a light diffusing panel having a lower surface and an obverse surface, said light diffusing panel having its lower surface adjacent and substantially parallel to said upper surface of the light transmitting panel, said light transmitting and light diffusing panel having an optical separation therebetween, impervious means to light energy on said obverse surface, indicia means formed on the obverse surface, said impervious means defining the outlines of said indicia means, and light diffusing means of a predetermined geometric pattern selectively positioned on the lower surface of said light transmitting panel substantially opposite said indicia means, whereby a portion of the light energy specularly reflected in said light transmitting panel is diffusely reflected by said diffusing means from the lower reflecting surface of the light transmitting panel into and through the light diffusing panel to the indicia means for illumination thereof, said light diffusing means including a coating of light diffusing material applied directly to the plane polished lower surface of the light transmitting panel, the upper and lower reflecting surfaces of the light transmitting panel being otherwise substantially bare.

4. In a duo-panel edge illumination system, means for illuminating a dial or the like, said means including a light transmitting panel of transparent material having a light admitting edge portion and an upper and a lower surface portion, said upper and lower surface portions being plane, polished and parallel, a light source positioned adjacent said light admitting edge portion whereby light rays entering said light transmitting panel are specularly reflected, internally, between the upper and lower surface portions, a translucent light diffusing panel having an obverse surface with indicia means formed thereon and a plane lower surface portion, the light diffusing panel comprising a material with characteristics for diffusely reflecting light rays entering therein, said upper surface of said light transmitting panel and the lower surface of said light diffusing panel being positioned adjacent and substantially parallel to each other with an optical separation therebetween, said indicia means comprising raised portions on the obverse surface of the light diffusing panel, opaque means on said obverse surface surrounding said indicia means, and diffuse reflecting areas of predetermined sizes and shapes positioned on and in optical contact with the plane polished the lower surface of said light transmitting panel opposite said indicia means for diffusely reflecting portions of the light rays specularly reflected in the light transmitting panel in the direction of said indicia means, the upper and lower plane polished surfaces being otherwise substantially bare, whereby light energy is transmitted from the light transmitting panel to the light diffusing panel and diffusely reflected therein for illumination of said indicia means.

5. In a duo-panel edge illumination system, means for illuminating a dial or the like, said means comprising a transparent light transmitting panel having plane, polished and parallel upper and lower surfaces operative to specularly reflect light rays introduced therein, a light diffusing panel physically supported upon said light transmitting panel, said light transmitting panel and said light diffusing panel having an optical separation therebetween, indicia means formed on the obverse surface of said light diffusing panel, said indicia means comprising raised portions defining graduations and characters, an opaque coating on said obverse surface surrounding said raised portions defining the indicia means, and light diffusing means of substantially the same shape and size as said raised portions which define said indicia means formed on the lower surface of said light transmitting panel in optical contact with the plane polished lower surface, the upper and lower plane, polished surfaces of the light transmitting panel being otherwise substantially bare, whereby portions of the light rays introduced in the light transmitting panel are selectively and diffusely reflected into the light diffusing panel by the light diffusing means to the raised portions for illumination thereof.

6. In a duo-panel edge illumination system, means for illuminating a dial or the like comprising, a transparent light transmitting panel having parallel upper and lower surfaces operative to specularly reflect light rays introduced therein, a translucent light diffusing panel including translucent indicia means formed on the obverse surface thereof mounted in parallel relationship with said light transmitting panel, a separating element interposed between said light transmitting and light diffusing panels and having undulated upper and lower surfaces, said separating element being operative to support said light diffusing panel upon said light transmitting panel, opaque means on the obverse surface of said light diffusing panel surrounding said indicia means, and light diffusing means positioned on the under side of said light transmitting panel and operative to selectively reflect portions of the light rays introduced in the light transmitting panel from said panel through the separating element into and through the light diffusing panel to the indicia means for the illumination thereof.

7. A duo-panel edge illumination system for the illumination of dials and panels comprising, a first transparent panel having substantially parallel surfaces operative to specularly reflect light rays introduced therein, a second translucent panel in parallel relationship with said first panel, said second panel comprising a flat plate having a plurality of raised portions on its obverse surface defining indicia means, an opaque coating on said obverse surface surrounding said indicia means and covering the obverse surface, a separating element having undulated upper and lower surfaces interposed between said first and second panels and operative to physically support said first panel upon said second panel, said first panel being substantially free of optical contact therewith, and a plurality of light diffusing surfaces positioned upon the lower surfaces of said first panel opposite said indicia means, each of said diffusing surfaces being of substantially the same area and configuration as its respective indicium, whereby portions of the light rays specularly reflected through the first panel are reflected therefrom by the light diffusing surfaces through the separating element into and through the translucent panel for illuminating the indicia thereon.

8. In a duo-panel edge illumination system for the illumination of a dial and the like, a transparent light transmitting panel having substantially parallel upper and lower surfaces and being operative to specularly reflect light rays introduced therein from a light source, a translucent light diffusing panel adjacent and parallel to said light transmitting panel, said light transmitting and light diffusing panels having an optical separation therebetween, said light diffusing panel comprising a flat plate having raised portions defining indicia means on its obverse surface, a reflecting coating on said obverse surface surrounding said raised portions, an opaque coating on said obverse surface surrounding said raised portions and covering said reflecting coating, and diffusing means of various geometrical patterns selectively positioned on the lower surface of said light transmitting panel opposite the indicia, whereby light rays diffusely reflected by said diffusing means pass from the light transmitting panel into and through the light diffusing panel to illuminate the indicia means.

9. In a duo-panel edge illumination system for the illumination of a dial or the like, a transparent light transmitting panel having an upper and a lower surface for specularly reflecting light rays introduced therein, a translucent light diffusing panel adjacent to said light transmitting panel, said light diffusing and light transmitting panels having an optical separation therebetween, said light diffusing panel comprising raised portions defining indicia on the obverse surface thereof, an opaque coating surrounding said indicia and covering said obverse surface, the raised portions being of a height greater than the thickness of said opaque coating and exposing an area thereof to an external light source, and a plurality of light diffusing means selectively positioned on the lower surface of said light transmitting panel opposite said indicia each of said diffusing means being of substantially the same geometric pattern as its respective indicium, whereby portions of the light rays specularly reflected in the light transmitting panel are diffusely reflected therefrom by the diffusing means into and through the light diffusing panel to illuminate the indicia on the obverse surface thereof.

10. A duo-panel edge illumination system as defined in claim 9 but further characterized by the raised portions defining the indicia, being formed of a material having a graduated density.

11. A duo-panel illumination system comprising a transparent light transmitting panel having plane, polished and parallel front and rear surfaces for specularly reflecting light rays introduced into such panel, a light source operable to project light rays into said light transmitting panel for specular reflection of light therethrough, an indicia panel positioned in front of said light transmitting panel and having front and rear surfaces thereof in parallel relation to like surfaces of the light transmitting panel, means optically separating the rear surface of the indicia panel from the front surface of the light transmitting panel, said separating means providing limited physical contact between the two panels without substantial optical contact therebetween, the front polished surface of the light transmitting panel being otherwise bare and free of interference with the transmission of light through such panel, a light impervious coating on the front surface of the indicia panel, light pervious indicia formed on said indicia panel, said light impervious coating having openings therein adjacent the indicia whereby such indicia are exposed to view, and light diffusing means selectively positioned on and in optical contact with the rear surface of the light transmitting panel opposite the indicia formed on the indicia panel for selectively directing a portion of said light rays to said indicia for illumination thereof, the rear polished surface of the light transmitting panel being otherwise bare and free of interference with the transmission of light through such panel.

References Cited in the file of this patent

UNITED STATES PATENTS

| | | |
|---|---|---|
| 1,707,965 | Scantleburg | Apr. 2, 1929 |
| 1,799,545 | Chase | Apr. 7, 1931 |
| 1,914,932 | Wamser | June 20, 1933 |
| 1,994,519 | James | Mar. 19, 1935 |
| 2,095,558 | Oberacker | Oct. 12, 1937 |
| 2,290,278 | Failla | July 21, 1942 |
| 2,358,203 | Best | Sept. 12, 1944 |
| 2,566,026 | Hughes | Aug. 28, 1951 |
| 2,602,036 | Sullivan | July 1, 1952 |
| 2,637,296 | Colt | May 5, 1953 |
| 2,646,637 | Nierenberg | July 28, 1953 |
| 2,660,824 | Neugass | Dec. 1, 1953 |
| 2,768,605 | Sturges | Oct. 30, 1956 |
| 2,848,830 | Dmitriev | Aug. 26, 1958 |